(12) United States Patent
Toyama et al.

(10) Patent No.: US 11,745,560 B2
(45) Date of Patent: Sep. 5, 2023

(54) BLOWER UNIT

(71) Applicant: DENSO CORPORATION, Kariya (JP)

(72) Inventors: Aro Toyama, Kariya (JP); Fumiaki Kitamura, Kariya (JP); Tomohiro Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 17/374,489

(22) Filed: Jul. 13, 2021

(65) Prior Publication Data

US 2021/0339605 A1 Nov. 4, 2021

Related U.S. Application Data

(63) Continuation of application No. PCT/JP2020/001335, filed on Jan. 16, 2020.

(30) Foreign Application Priority Data

Feb. 5, 2019 (JP) ................................. 2019-019003

(51) Int. Cl.
*B60H 1/00* (2006.01)
*B60H 1/24* (2006.01)

(52) U.S. Cl.
CPC ..... *B60H 1/00864* (2013.01); *B60H 1/00828* (2013.01); *B60H 1/00849* (2013.01)

(58) Field of Classification Search
CPC ............ B60H 1/00864; B60H 1/00849; B60H 1/00685; B60H 2001/00085; B60H 2001/00135
USPC ................................................. 454/140, 143
See application file for complete search history.

(56) References Cited

U.S. PATENT DOCUMENTS

| 10,479,164 | B2 * | 11/2019 | Ryu | ..................... F04D 27/0246 |
| 11,458,807 | B2 * | 10/2022 | Ryu | ......................... B60H 1/26 |
| 2012/0241126 | A1 * | 9/2012 | Kishi | ..................... B60H 1/008 165/42 |
| 2013/0319630 | A1 * | 12/2013 | Yamamoto | ......... B60H 1/00764 165/42 |

(Continued)

FOREIGN PATENT DOCUMENTS

| EP | 3335918 A1 | 6/2018 |
| JP | 2012-171489 A | 9/2012 |

(Continued)

*Primary Examiner* — Ko-Wei Lin
(74) *Attorney, Agent, or Firm* — Harness, Dickey & Pierce, P.L.C.

(57) ABSTRACT

A blower unit includes a casing defining a first passage and a second passage, a first internal-external air switching member, a second internal-external air switching member, and a partition defining an opening. During a two-layer internal/external air mode, the first internal-external air switching member opens an external air inlet and closes an internal air inlet and the second internal-external air switching member closes the external air inlet and opens the internal inlet, so that the external air is directly introduced into the first passage through the external air inlet and the external air in the second passage is introduced into the first passage through the opening of the partition and the internal air is directly introduced into the second passage through the internal air inlet and the internal air in the first passage is introduced into the second passage through the opening of the partition.

6 Claims, 7 Drawing Sheets

(56) References Cited

U.S. PATENT DOCUMENTS

2014/0065943 A1* 3/2014 Clemence ............... B60H 1/24
    454/236
2016/0355069 A1* 12/2016 Vincent .................. F04D 25/06

FOREIGN PATENT DOCUMENTS

| JP | 2017056864 A | 3/2017 |
| JP | 2017144757 A | 8/2017 |
| JP | 2018114780 A | 7/2018 |

* cited by examiner

BLOWER UNIT

CROSS REFERENCE TO RELATED APPLICATION

The present application is a continuation application of International Patent Application No. PCT/JP2020/001335 filed on Jan. 16, 2020, which designated the U.S. and claims the benefit of priority from Japanese Patent Application No. 2019-019003 filed on Feb. 5, 2019. The entire disclosures of all of the above applications are incorporated herein by reference.

TECHNICAL FIELD

The present disclosure relates to a blower unit for a vehicle air conditioner configured to supply conditioned air into a vehicle compartment.

BACKGROUND

A blower unit for a vehicle air conditioner has an internal-external air switching box defining two passages and has internal-external air switching doors respectively at the two passages. This blower unit has a two-layer external/internal air mode in which an external air is introduced into one of the two air passages and an internal air is introduced into the other of the two air passages.

SUMMARY

A blower unit includes blower casing defining an external air inlet and an internal air inlet, a first internal-external air switching member, a second internal-external air switching member, and a partition. The blower casing defines therein a first passage and a second passage. The blower casing further defines an external air inlet through which the external air is introduced into the casing and an internal air inlet through which the internal air is introduced into the casing. The first internal-external air switching member is disposed in the first passage and configured to selectively open and close the external air inlet and the internal air inlet. The second internal-external air switching member is disposed in the second passage and configured to selectively open and close the external air inlet and the internal air inlet. The partition is located between the first internal-external air switching member and the second internal-external switching member and configured to separate the first passage from the second passage.

During a two-layer internal/external air mode, the external air is introduced into the first passage through the external air inlet and the internal air is introduced into the second passage through the internal air inlet. The partition defines an opening fluidly connecting between the first passage and the second passage at least during the two-layer external/internal air mode.

DESCRIPTION OF EMBODIMENTS

To begin with, examples of relevant techniques will be described.

A blower unit for a vehicle air conditioner has an internal-external air switching box defining two passages and has internal-external air switching doors respectively at the two passages. This blower unit has a two-layer external/internal air mode in which an air outside of the vehicle compartment (i.e., external air) is introduced into one of the two air passages and an air inside of the vehicle compartment (i.e., internal air) is introduced into the other of the two air passages.

However, in this blower unit, a pressure loss when introducing the external air and the internal air into the air passages is large in the two-layer external/internal air mode. Thus, in the two-layer external/internal air mode, it is difficult to secure an introducing amount of the external air and the internal air and a heating efficiency is decreased.

In view of the above points, it is objective of the present disclosure to reduce the pressure loss when introducing the external air and the internal air into the blower unit for the vehicle air conditioner having the two-layer external/internal air mode.

The present disclosure employs the following technical means to achieve the above objectives.

A blower unit of the present disclosure includes a blower casing defining an external air inlet and an internal air inlet, a first internal-external air switching member, a second internal-external air switching member, and a partition. The blower casing defines therein a first passage and a second passage. The blower casing further defines an external air inlet through which the external air is introduced into the casing and an internal air inlet through which the internal air is introduced into the casing. The first internal-external air switching member is disposed in the first passage and configured to selectively open and close the external air inlet and the internal air inlet. The second internal-external air switching member is disposed in the second passage and configured to selectively open and close the external air inlet and the internal air inlet. The partition is located between the first internal-external air switching member and the second internal-external switching member and configured to separate the first passage from the second passage.

The blower unit has a two-layer external/internal air mode where the external air is introduced into the first passage through the external air inlet and the internal air is introduced into the second passage through the internal air inlet. The partition defines an opening fluidly connecting between the first passage and the second passage at least during the two-layer external/internal air mode.

This makes it possible to reduce the pressure loss when introducing the external air into the first passage and when introducing the internal air into the second passage during the two-layer external/internal air mode. As a result, it is possible, during the two-layer external/internal air mode, to increase an introducing amount of the external air and the internal air or to reduce power consumption of a blower motor. Thus, the heating efficiency can be improved.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. The present disclosure is not limited to combinations of embodiments which combine parts that are explicitly described as being combinable. As long as no problems are present, the various embodiments may be partially combined with each other even if not explicitly described.

First Embodiment

Hereinafter, a blower unit 1 for a vehicle air conditioner of a first embodiment of the present disclosure will be described. The vehicle air conditioner has an air conditioner unit (not shown) in addition to the blower unit 1. The blower unit 1 is configured to supply an air outside of the vehicle compartment (i.e., an external air) and/or an air inside of the vehicle compartment (i.e., an internal air) to the air conditioner unit. The air conditioner unit includes an air-cooling heat exchanger, an air-heating heat exchanger, and blowing outlets. The air conditioner unit is configured to supply air conditioned by the air-cooling heat exchanger and the air-heating heat exchanger into the vehicle compartment through the blowing outlets.

Figure 1:
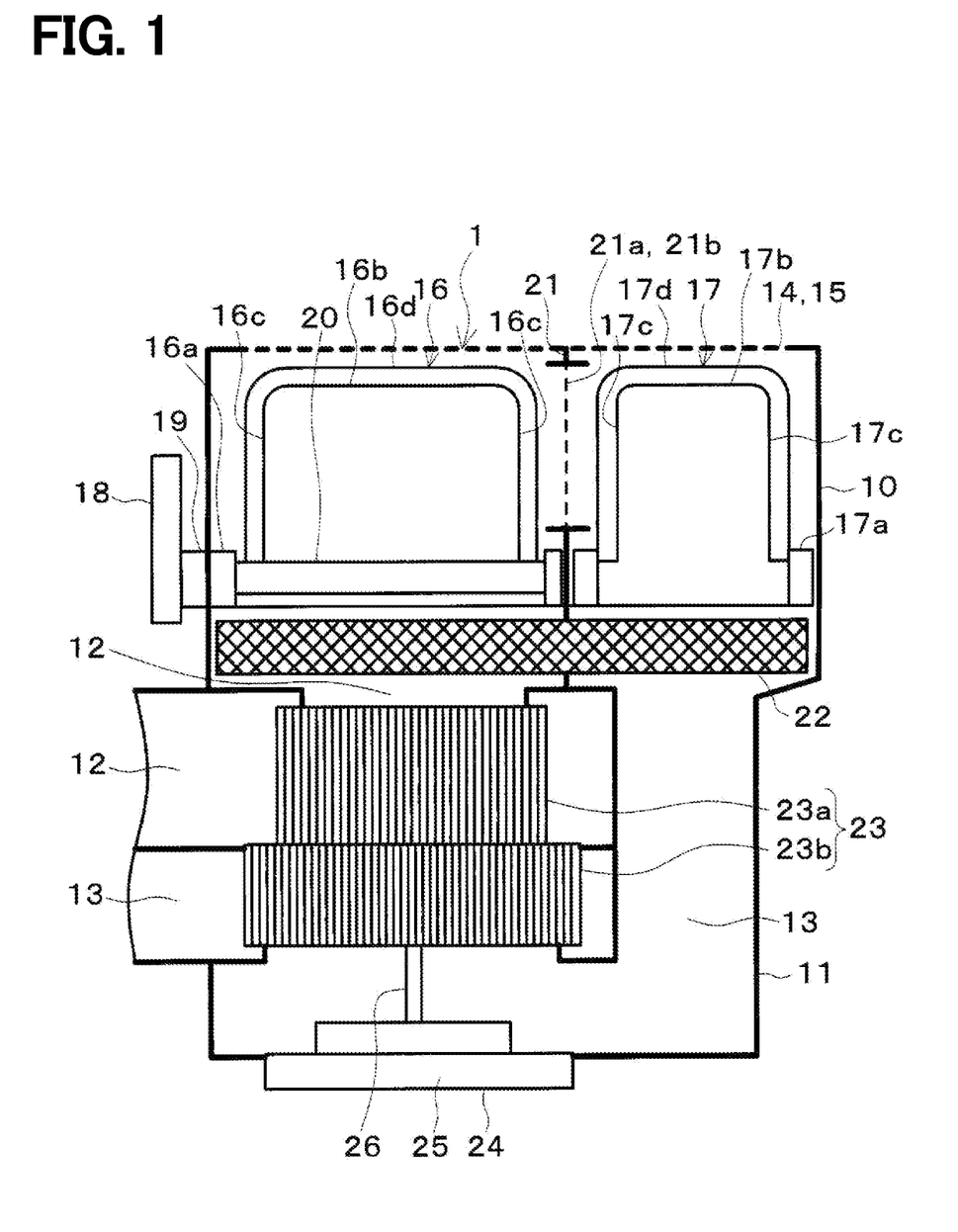
FIG. 1 is a cross-sectional view showing a schematic configuration of a blower unit of a first embodiment.
Figure 2:
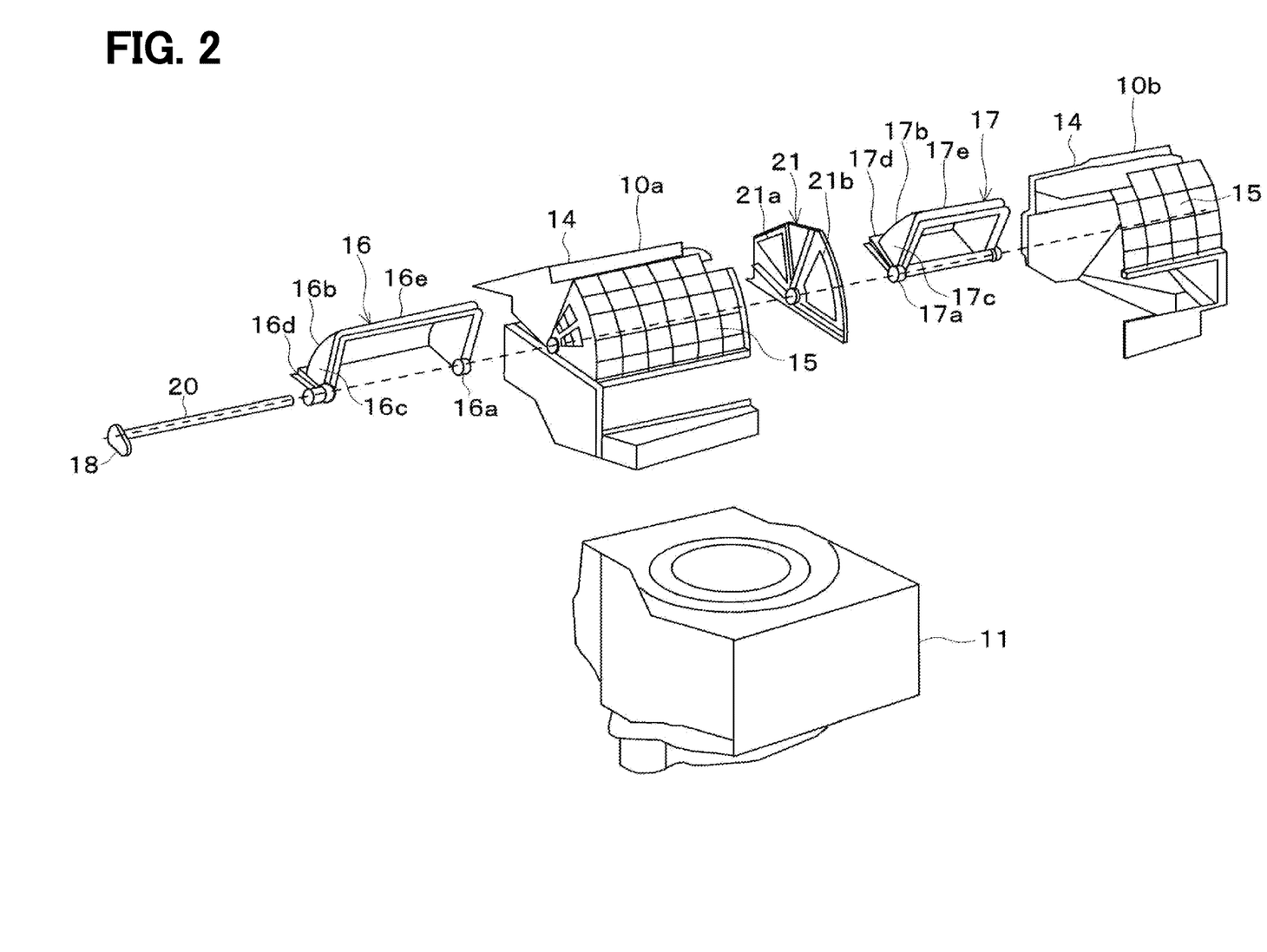
FIG. 2 is an exploded perspective view of the blower unit.

As shown in FIGS. 1 and 2, the blower unit 1 includes blower casings 10 and 11. The blower casings 10 and 11 include an internal-external air switching box 10 and a scroll casing 11. The internal-external air switching box 10 and the scroll casing 11 are made of, for example, a resin material. As shown in FIG. 2, the internal-external air switching box 10 is configured by combining a first member 10a and a second member 10b.

As shown in FIG. 1, the blower casings 10 and 11 define therein a first passage 12 and a second passage 13. The first passage 12 and the second passage 13 are adjacent to each other. The air to be supplied to an upper part of the vehicle compartment flows through the first passage 12. The air to be supplied to a lower part of the vehicle compartment flows through the second passage 13.

The internal-external air switching box 10 defines an external air inlet 14 and an internal air inlet 15. The external air inlet 14 is defined to introduce the external air into the passages 12 and 13. The external air inlet 14 includes a first external air inlet 14a through which the external air is introduced into the first passage 12 and a second external air inlet 14b through which the external air is introduced into the second passage 13. The internal air inlet 15 is defined to introduce internal air into the passages 12 and 13. The internal air inlet includes a first internal air inlet 15a through which the internal air is introduced into the first passage 12 and a second internal air inlet 15b through which the internal air is introduced into the second passage 13. In the present embodiment, the external air inlet 14 and the internal air inlet 15 are defined in an upper portion of the internal-external air switching box 10. Each of the external air inlet 14 and the internal air inlet 15 is defined across both the two passages 12 and 13. The external air inlet 14 and the internal air inlet 15 are located adjacent to each other. In FIG. 1, the external air inlet 14 is defined on a far side of a plane of paper and the internal air inlet 15 is defined on a front side of the plane of the paper.

Figure 3:
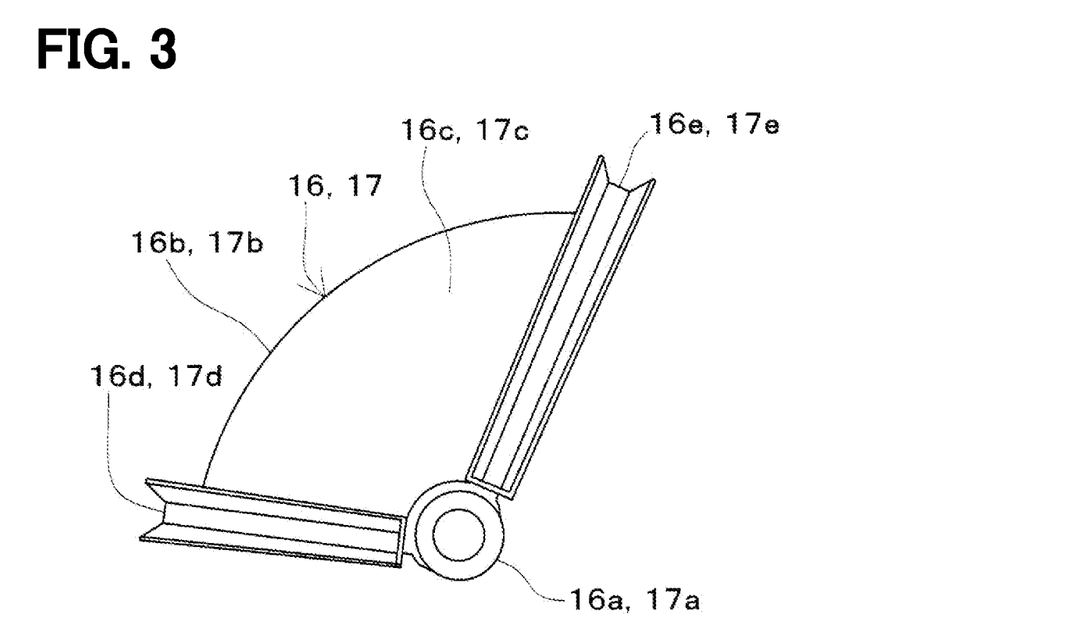
FIG. 3 is a side view of an internal-external air switching door.

As shown in FIGS. 1 to 3, internal-external air switching doors 16 and 17 are located in the internal-external air switching box 10. The internal-external air switching doors 16 and 17 are configured to switch the air to be introduced into the passages 12 and 13 between the external air and the internal air. The internal-external air switching doors 16 and 17 may be made of a resin material.

The internal-external air switching doors 16 and 17 are located in the most upstream portions of the passages 12 and 13. The internal-external air switching doors 16 and 17 are a first internal-external air switching door 16 and a second internal-external air switching door 17. The first internal-external air switching door 16 is located in the first passage 12 and the second internal-external air switching door 17 is located in the second passage 13. The first internal-external air switching door 16 corresponds to a first internal-external air switching member and the second internal-external air switching door 17 corresponds to a second internal-external air switching member.

Each of the internal-external air switching doors 16 and 17 is a rotary door configured to rotate about a rotational shaft 16a, 17a. The first internal-external air switching door 16 and the second internal-external air switching door 17 have the same basic shape while the rotational shaft 16a of the first internal-external air switching door 16 has a length in a longitudinal direction longer than that of the rotational shaft 17a of the second internal-external air switching door 17.

Each of the internal-external air switching doors 16 and 17 includes an outer circumferential portion 16b, 17b and side portions 16c, 17c. Each of the outer circumferential portions 16b and 17b has a plate surface curved in a rotating direction of the rotational shaft 16a, 17a. A cross-section of the outer circumferential portion 16b, 17b perpendicular to the rotational shaft 16a, 17a has a circular arc shape. The side portions 16c, 17c are located at both ends of the outer circumferential portion 16b, 17b in the longitudinal direction of the rotational shaft 16a, 17a. Each of the side portions 16c, 17c has a sector shape that connects a circular arc end portion of the outer circumferential portion 16b, 17b and the rotational shaft 16a, 17a. Due to the outer circumferential portions 16b, 17b and the side portions 16c, 17c, the internal-external air switching doors 16, 17 can restrict external air from flowing into the passages 12, 13 through the external air inlet 14 or restrict internal air from flowing into the passages 12, 13 through the internal air inlet 15.

The first internal-external air switching door 16 has sealing portions 16d and 16e. The second internal-external air switching door 17 has sealing portions 17d and 17e. The sealing portions 16d and 16e are respectively disposed at both end portions of the first internal-external air switching door 16 in the rotational direction. The sealing portions 17d and 17e are respectively disposed at both end portions of the second internal-external air switching door 17 in the rotational direction. The sealing portions 16*d* and 16*e* (17*d* and 17*e*) are provided to be in contact with the outer circumferential portion 16*b* (17*b*) and the side portions 16*c* (17*c*). The sealing portions 16*d*, 16*e*, 17*d*, 17*e* are external air sealing portions 16*d* and 17*d* for the external air inlet 14 and internal sealing portions 16*e* and 17*e* for the internal air inlet 15.

The sealing portions 16*d*, 16*e*, 17*d* and 17*e* may be elastic members such as elastomer. The sealing portions 16*d*, 16*e*, 17*d* and 17*e* are configured to come into contact with ribs 21*c* to 21*f* of a partition 21 which will be described later and prevent air from leaking through contact portions between the internal-external air switching doors 16 and 17 and the ribs 21*c* to 21*f* of the partition 21.

The rotational shaft 16*a* of the first internal-external air switching door 16 is coaxial with the rotational shaft 17*a* of the second internal-external air switching door 17. The internal-external air switching doors 16, 17 are configured to selectively open and close the external air inlet 14 or the internal air inlet 15 by rotating about the rotational shaft 16*a*, 17*a*.

When the internal-external air switching doors 16 and 17 move to a position corresponding to the internal air inlet 15, the internal air inlet 15 is closed and the external air inlet 14 is opened. The position corresponding to the internal air inlet 15 is an external air introducing position for introducing external air into the passages 12 and 13 through the external air inlet 14.

When the internal-external air switching doors 16 and 17 move to a position corresponding to the external air inlet 14, the external air inlet 14 is closed and the internal air inlet 15 is opened. The position corresponding to the external air inlet 14 is an internal air introducing position for introducing internal air into the passages 12 and 13 through the internal air inlet 15.

The blower unit 1 includes an actuator 18 configured to rotate the internal-external air switching doors 16 and 17. A driving force generated by the actuator 18 is separately transmitted to the first internal-external air switching door 16 and the second internal-external air switching door 17 through a link mechanism 19 and a door shaft 20. Thus, the first internal-external air switching door 16 and the second internal-external air switching door 17 can rotate independently of each other.

Figure 4:
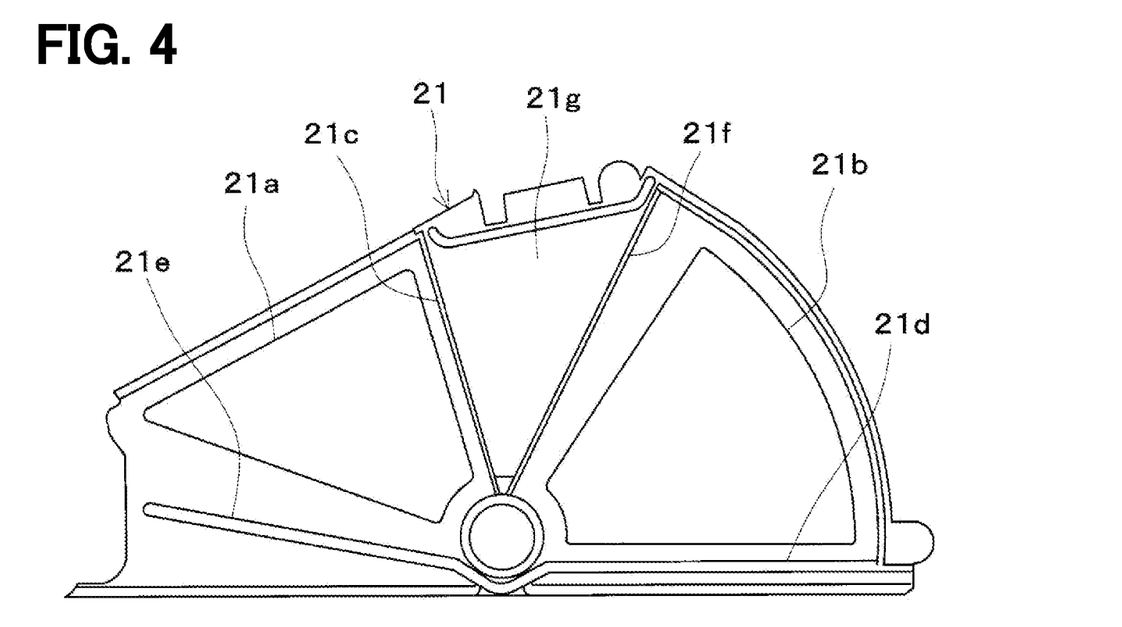
FIG. 4 is a side view of a partition.

As shown in FIGS. 1, 2 and 4, the partition 21 is provided inside the internal-external air switching box 10. The partition 21 is a plate member and may be made of a resin material.

The partition 21 is disposed in the internal-external air switching box 10 and divides an inner space thereof into the first passage 12 and the second passage 13. The partition is arranged between the first internal-external air switching door 16 and the second internal-external air switching door 17. The first internal-external air switching door 16 and the second internal-external air switching door 17 are arranged adjacent to each other across the partition 21. The partition 21 separates the first passage 12 from the second passage 13 adjacent to the first passage 12 at a position between the first internal-external air switching door 16 and the second internal-external air switching door 17.

The partition 21 defines a first opening 21*a* and a second opening 21*b*. The first opening 21*a* is defined at a position corresponding to the external air inlet 14 and the second opening 21*b* is defined at a position corresponding to the internal air inlet 15. The openings 21*a* and 21*b* of the partition 21 fluidly connects between the first passage 12 and the second passage 13.

The partition 21 includes the four ribs 21*c* to 21*f*. The ribs 21*c* to 21*f* are located on both a surface of the partition 21 facing the first internal-external air switching door 16 and a surface of the partition 21 facing the second internal-external air switching door 17. The ribs 21*c* to 21*f* protrude from the plate surface of the partition 21.

The first rib 21*c* is located at a position corresponding to the external air sealing portions 16*d* and 17*d* of the internal-external air switching doors 16 and 17 when the internal-external air switching doors 16 and 17 are located at the external air introducing position. The second rib 21*d* is located at a position corresponding to the internal air sealing portions 16*e* and 17*e* of the internal-external air switching doors 16 and 17 when the internal-external air switching doors 16 and 17 are located at the external air introducing position.

The third rib 21*e* is located at a position corresponding to the external sealing portions 16*d* and 17*d* of the internal-external air switching doors 16 and 17 when the internal-external air switching doors 16 and 17 are located at the internal air introducing position. The fourth rib 21*f* is located at a position corresponding to the internal air sealing portions 16*e* and 17*e* of the internal-external air switching doors 16 and 17 when the internal-external air switching doors 16 and 17 are located at the internal air introducing position.

The partition 21 has a central wall portion 21*g* between the first opening 21*a* and the second opening 21*b*. The central wall portion 21*g* is an area surrounded by the first rib 21*c* and the fourth rib 21*f* and does not define any openings. The central wall portion 21*g* is located not to mix the external air and the internal air between the two passages 12 and 13 during the two-layer external/internal air mode which will be described later.

As shown in FIG. 1, the internal-external air switching box 10 includes an air filter 22. The air filter 22 is provided at a position downstream of the internal-external air switching doors 16 and 17 in an airflow direction. The air filter 22 is arranged across the first passage 12 and the second passage 13. The air introduced through the external air inlet 14 and the internal air inlet 15 passes through the air filter 22.

Blower fans 23 configured to blow introduced air is disposed in portions of the passages 12 and 13 in the scroll casing 11. The air having passed through the air filter 22 is supplied to the blower fans 23.

The blower fans 23 include a first fan 23*a* arranged in the first passage 12 and a second fan 23*b* arranged in the second passage 13. The first fan 23*a* and the second fan 23*b* of the present embodiment are centrifugal fans (i.e., sirocco fans). The first fan 23*a* is coaxial with the second fan 23*b*.

The first fan 23*a* and the second fan 23*b* blow the air introduced through the external air inlet 14 and the internal air inlet 15 to the air conditioner unit (not shown) located at a position downstream of the first fan 23*a* and the second fan 23*b*. The first fan 23*a* and the second fan 23*b* are partitioned off from each other and the first fan 23*a* blows the air in the first passage 12 and the second fan 23*b* blows the air in the second passage 13.

An electric blower motor 25 is disposed in the scroll casing 11 with a motor flange 24. The blower motor 25 has a rotational shaft 26 and the blower fans 23 are fixed to the rotational shaft 26. The blower fans 23 are rotated by the blower motor 25.

Figure 5:
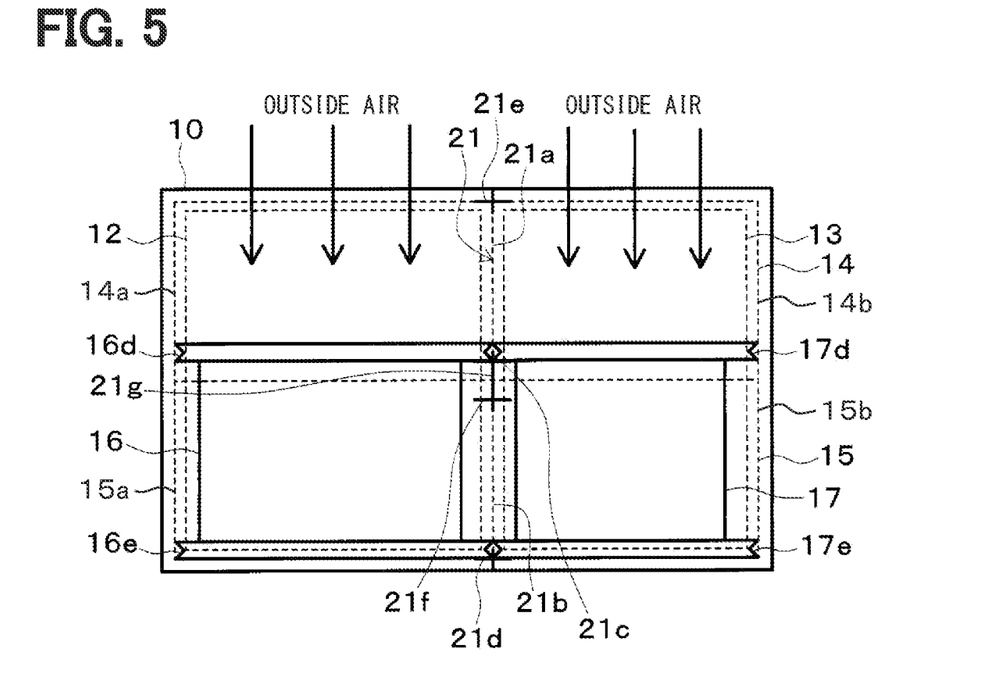
FIG. 5 is a diagram showing positions of the internal-external air switching doors of the first embodiment during an external air mode.
Figure 6:
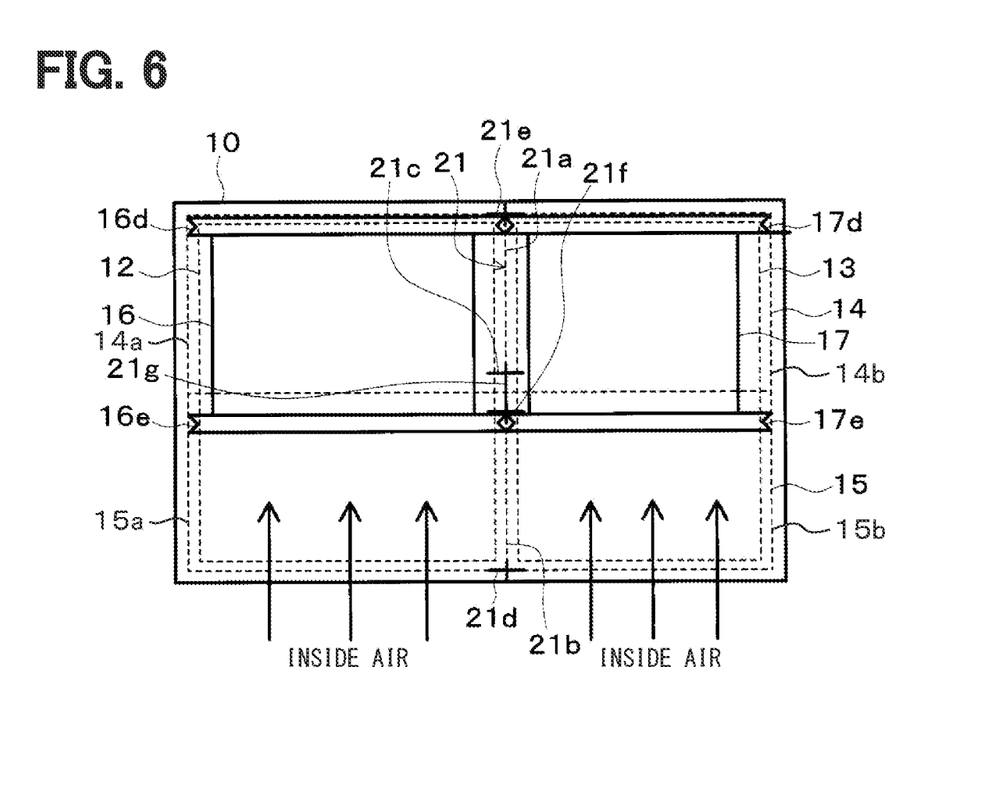
FIG. 6 is a diagram showing positions of the internal-external air switching doors of the first embodiment during an internal air mode.
Figure 7:
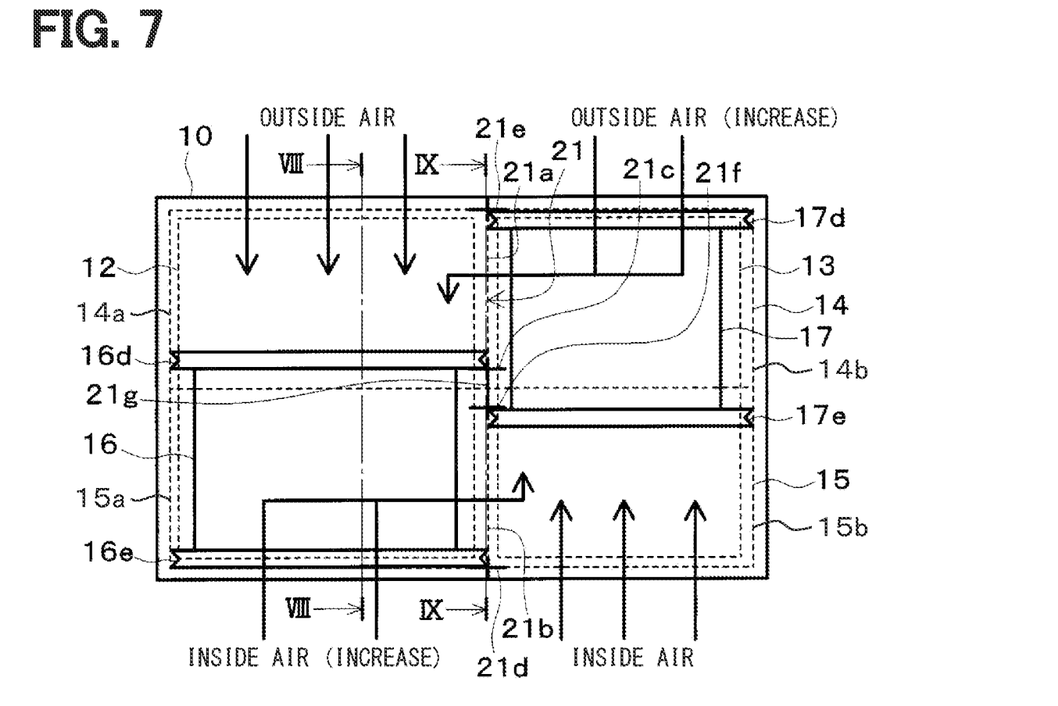
FIG. 7 is a diagram showing positions of the internal-external air switching doors of the first embodiment during a two-layer external/internal air mode.

Next, air introducing modes of the blower unit 1 will be described with reference to FIGS. 5 to 9. In FIGS. 5 to 7, an arranging direction of the first passage 12 and the second passage 13 is a right-left direction on the plane of paper.

Figure 8:
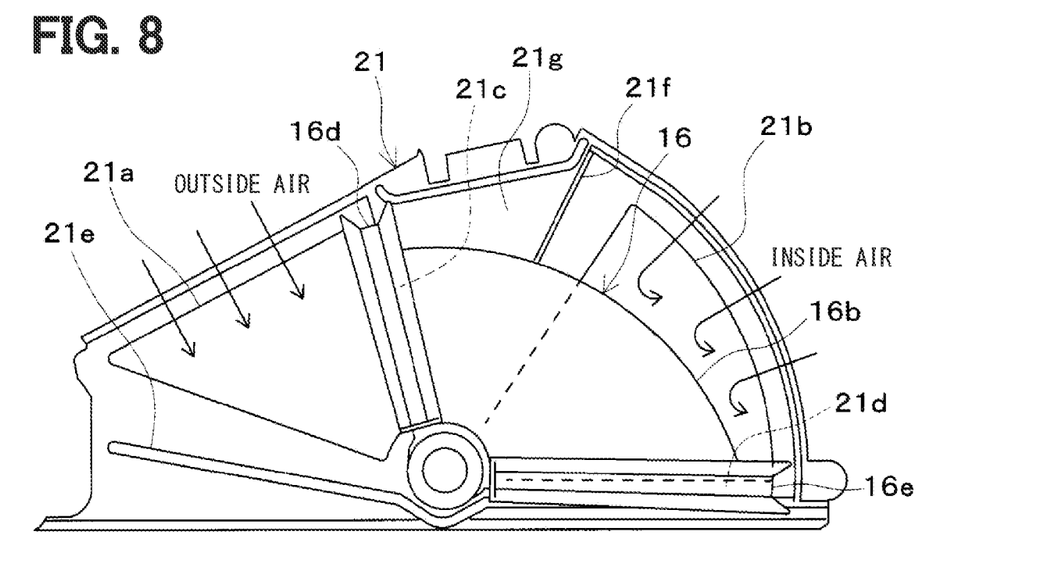
FIG. 8 is a cross-sectional view taken along a line VIII-VIII in FIG. 7.
Figure 9:
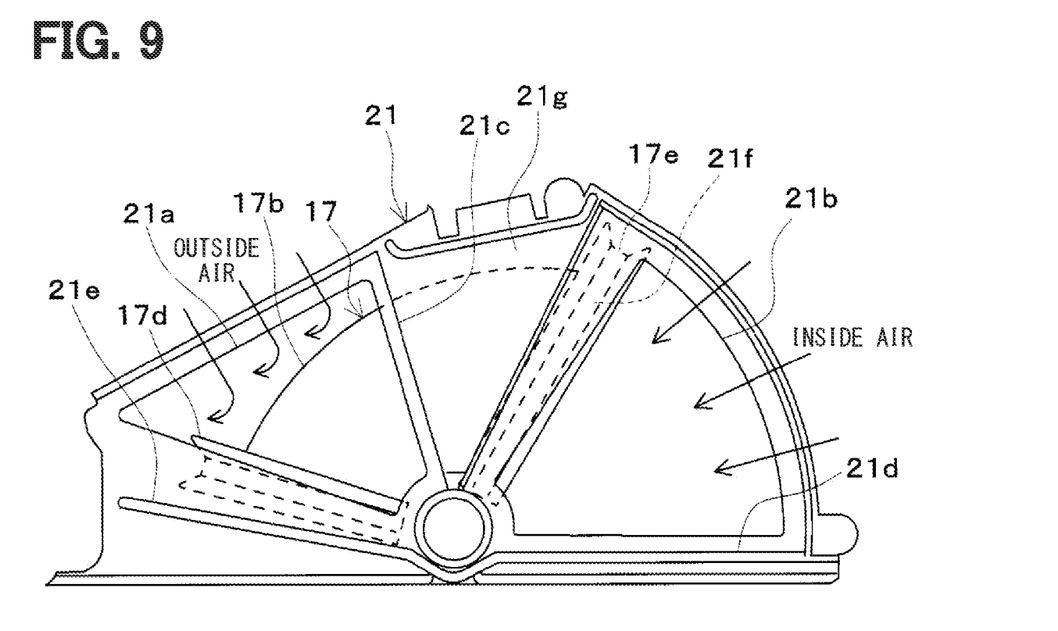
FIG. 9 is a cross-sectional view taken along a line IX-IX in FIG. 7.

Further, in FIGS. 8 and 9, the arranging direction of the first passage 12 and the second passage 13 is a vertical direction on the plane of paper. In FIGS. 8 and 9, the first passage 12 is located on a front side of the plane of paper and the second passage 13 is located on a far side of the plane of paper.

The blower unit 1 of the present embodiment can switch among multiple air introducing modes by the internal-external air switching doors 16 and 17. In the present embodiment, the external air mode, the internal air mode, and the two-layer external/internal air mode are present as the air introducing modes.

During the external air mode, external air is introduced into the first passage 12 and the second passage 13. That is, only external air is used as conditioned air. During the internal air mode, internal air is introduced into the first passage 12 and the second passage 13. That is, only internal air is used as conditioned air. During the two-layer external/internal air mode, external air is introduced into the first passage 12 and internal air is introduced into the second passage 13. That is, both external air and internal air are used as conditioned air. During the two-layer external/internal air mode, conditioned external air is blown to an upper portion of the vehicle compartment to prevent windows from fogging up and conditioned internal air is blown toward legs of a passenger to improve a heating efficiency.

As shown in FIG. 5, during the external air mode, the first internal-external air switching door 16 and the second internal-external air switching door 17 are respectively located at the external air introducing positions. During the external air mode, the first internal-external air switching door 16 and the second internal-external air switching door 17 are located in the same position when viewed in the arranging direction in which the first passage 12 and the second passage 13 are arranged.

During the external air mode, the first internal-external air switching door 16 and the second internal-external air switching door 17 open the external air inlet 14 and close the internal air inlet 15. That is, the internal-external air switching doors 16 and 17 prevent internal air from flowing into the passages 12 and 13 through the internal air inlet 15 and external air is directly introduced into the passages 12 and 13 through the external air inlet 14.

As shown in FIG. 6, during the internal air mode, the first internal-external air switching door 16 and the second internal-external air switching door 17 are located at the internal air introducing positions. During the internal air mode, the first internal-external air switching door 16 and the second internal-external air switching door 17 are located at the same position when viewed in the arranging direction in which the first passage 12 and the second passage 13 are arranged.

During the internal air mode, the first internal-external air switching door 16 and the second internal-external air switching door 17 close the external air inlet 14 and open the internal air inlet 15. That is, the internal-external air switching doors 16 and 17 prevent external air from flowing into the passages 12 and 13 through the external air inlet 14 and internal air is directly introduced into the passages 12 and 13 through the internal air inlet 15.

As shown in FIG. 7, during the two-layer external/internal air mode, the first internal-external air switching door 16 is located at the external air introducing position and the second internal-external air switching door 17 is located at the internal air introducing position. During the two-layer external/internal air mode, the first internal-external air switching door 16 and the second internal-external air switching door 17 are located different positions when viewed in the arranging direction in which the first passage 12 and the second passage 13 are arranged.

During the two-layer external/internal air mode, the first internal-external air switching door 16 opens a part of the external air inlet 14 (i.e., the first external air inlet 14a) and closes a part of the internal air inlet 15 (i.e., the first internal air inlet 15a). In the first passage 12, the first internal-external air switching door 16 restricts internal air from flowing into the first passage 12 through the internal air inlet 15 and external air is directly introduced into the first passage 12 through the external air inlet 14.

During the two-layer external/internal air mode, the second internal-external air switching door 17 closes a part of the external air inlet 14 (i.e., the second external air inlet 14b) and opens a part of the internal air inlet 15 (i.e., the second internal air inlet 15b). In the second passage 13, the second internal-external air switching door 17 restricts external air from flowing into the second passage 13 through the external air inlet 14 and internal air is directly introduced into the second passage 13 through the internal air inlet 15.

As shown in FIGS. 7 and 8, internal air is restricted from flowing into the first passage 12 by the first internal-external air switching door 16 and the air is allowed to flow into the second passage 13 through the second opening 21b of the partition 21. Therefore, internal air is introduced into the second passage 13 directly through the internal air inlet 15 and through the second opening 21b of the partition 21 from the first passage 12. As a result, a pressure loss when the internal air is introduced into the second passage 13 can be reduced.

As shown in FIGS. 7 and 9, external air is restricted from flowing into the second passage 13 by the second internal-external air switching door 17 and the external air is allowed to flow into the first passage 12 through the first opening 21a of the partition 21. Thus, external air is introduced into the first passage 12 directly through the external air inlet 14 and through the first opening 21a of the partition 21 from the second passage 13. As a result, a pressure loss when external air is introduced into the first passage 12 can be reduced.

As shown in FIGS. 8 and 9, the openings 21a and 21b of the partition 21 are defined in positions upper than the internal-external air switching doors 16 and 17. Therefore, a ventilation resistance when external air and internal air pass through the openings 21a and 21b of the partition 21 can be reduced and an effect of reducing the pressure loss can be improved.

During the two-layer external/internal air mode, a portion of the first internal-external air switching door 16 and a portion of the second internal-external air switching door 17 are overlapped with each other when viewed in the arranging direction in which the first passage 12 and the second passage 13 are arranged. Specifically, a portion of the first internal-external air switching door 16 closer to the external air inlet 14 and a portion of the second internal-external air switching door 17 closer to the internal air inlet 15 are overlapped with each other.

The central wall portion 21g of the partition 21 is located at a position corresponding to an overlapping area between the first internal-external air switching door 16 and the second internal-external air switching door 17 during the two-layer external/internal air mode. The central wall portion 21g can separate internal air that is restricted from flowing into the first passage 12 by the first internal-external air switching door 16 from external air that is restricted from flowing into the second passage 13 by the internal-external air switching door 17.

During the two-layer external/internal air mode, the external air sealing portion 16d of the first internal-external air switching door 16 is in contact with the first rib 21c of the partition 21 and the internal air sealing portion 17e of the second internal-external air switching door 17 is in contact with the fourth rib 21f of the partition 21. Thereby, a gap between the first internal-external air switching door 16 and the partition 21 and a gap between the second internal-external air switching door 17 and the partition 21 are sealed and external air introduced into the first passage 12 can be surely separated from internal air introduced into the second passage 13.

That is, the external air sealing portion 16d of the first internal-external air switching door 16, the internal air sealing portion 17e of the second internal-external air switching door 17, the first rib 21c, and the fourth rib 21f of the partition 21 form a sealing structure that separates external air introduced into the first passage 12 from internal air introduced into the second passage 13.

In the first embodiment described above, the partition 21 provided between the two internal-external air switching doors 16 and 17 defines the openings 21a and 21b that fluidly connect between the two passages 12 and 13 adjacent to each other. As a result, during the two-layer external/internal air mode, a pressure loss when external air is introduced into the first passage 12 and a pressure loss when internal air is introduced into the second passage 13 can be reduced, thereby improving a heating efficiency.

Specifically, during the two-layer external/internal air mode, when a power consumption of the blower motor 25 is constant, an introducing amount of external air into the first passage 12 and an introducing amount of internal air into the second passage 13 can be increased. Further, during the two-layer external/internal air mode, when the introducing amount of external air into the first passage 12 and the introducing amount of internal air into the second passage 13 are constant, the power consumption of the blower motor 25 can be reduced.

Further, during the two-layer external/internal air mode, since the pressure loss when external air is introduced into the first passage 12 and the pressure loss when internal air is introduced into the second passage 13 can be reduced, noise generated when introducing external air and internal air can be suppressed.

Further, since the partition 21 defines the openings 21a and 21b, cost for a material of the partition 21 can be reduced. Further, since the partition 21 defines the openings 21a and 21b, the partition 21 can be lightened.

Second Embodiment

Next, a second embodiment of the present disclosure will be described. Hereinafter, only portions different from those of the first embodiment will be described.

In the second embodiment, the internal-external air switching box 10 does not include the partition 21. Therefore, in a space between the first internal-external air switching door 16 and the second internal-external air switching door 17, the first passage 12 and the second passage 13 are in communication with each other. The first passage 12 and the second passage 13 are separated from each other at a position downstream of the internal-external air switching doors 16 and 17.

Here, air introducing modes of the blower unit 1 of the second embodiment will be described.

Figure 10:
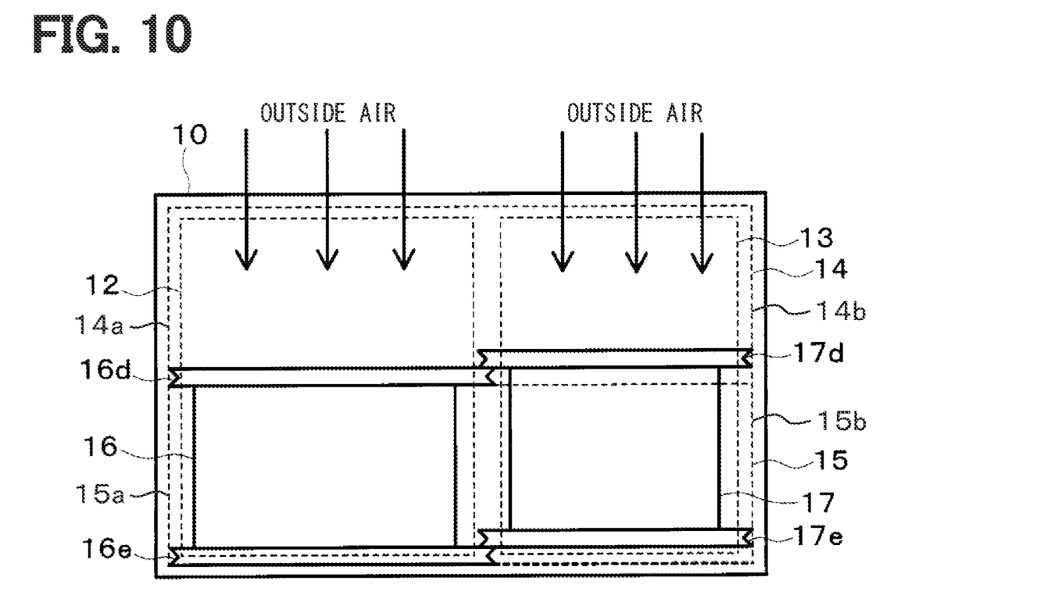
FIG. 10 is a diagram showing positions of internal-external air switching doors of a second embodiment during the external air mode.

As shown in FIG. 10, during the external air mode, the first internal-external air switching door 16 and the second internal-external air switching door 17 are respectively located at the external air introducing positions. During the external air mode, the internal-external air switching doors 16 and 17 restrict internal air from flowing into the passages 12 and 13 through the internal air inlet 15, so that external air is introduced into the passages 12 and 13 through the external air inlet 14.

At this time, the external air sealing portion 16d of the first internal-external air switching door 16 is in contact with the external air sealing portion 17d of the second internal-external air switching door 17. As a result, a gap between the first internal-external air switching door 16 and the second internal-external air switching door 17 is sealed. Therefore, external air introduced into the passages 12 and 13 can be separated from internal air that is restricted from flowing into the passages 12 and 13.

Figure 11:
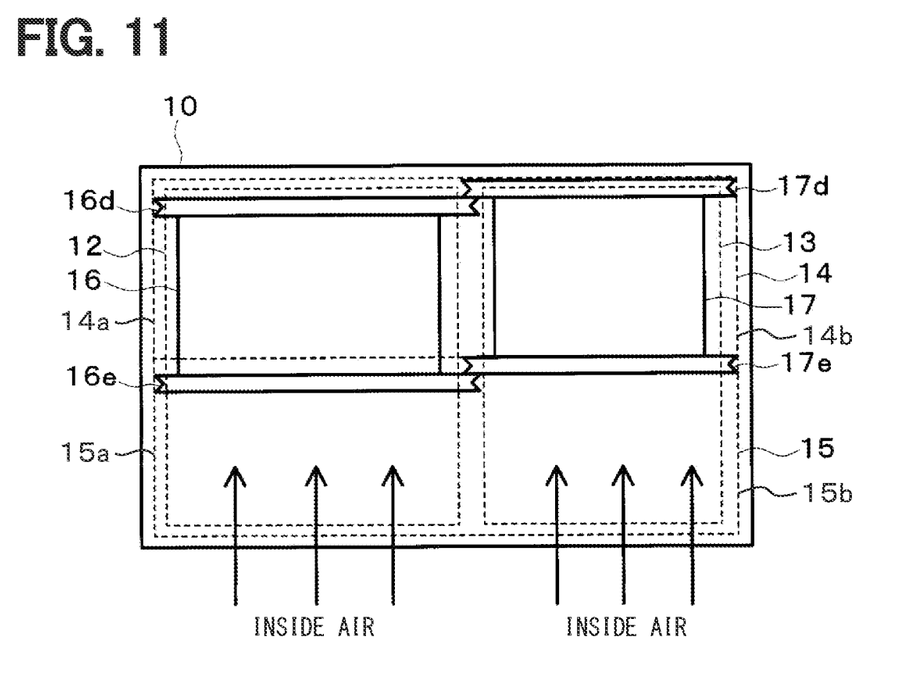
FIG. 11 is a diagram showing positions of the internal-external air switching doors of the second embodiment during the internal air mode.

As shown in FIG. 11, during the internal air mode, the first internal-external air switching door 16 and the second internal-external air switching door 17 are respectively located at the internal air introducing positions. That is, the internal-external air switching doors 16 and 17 prevent external air from flowing into the passages 12 and 13 through the external air inlet 14, so that internal air is directly introduced into the passages 12 and 13 through the internal air inlet 15.

At this time, the internal air sealing portion 16e of the first internal-external air switching door 16 is in contact with the internal air sealing portion 17e of the second internal-external air switching door 17. As a result, a gap between the first internal-external air switching door 16 and the second internal-external air switching door 17 is sealed. Therefore, internal air introduced into the passages 12 and 13 can be separated from external air that is restricted from flowing into the passages 12 and 13.

Figure 12:
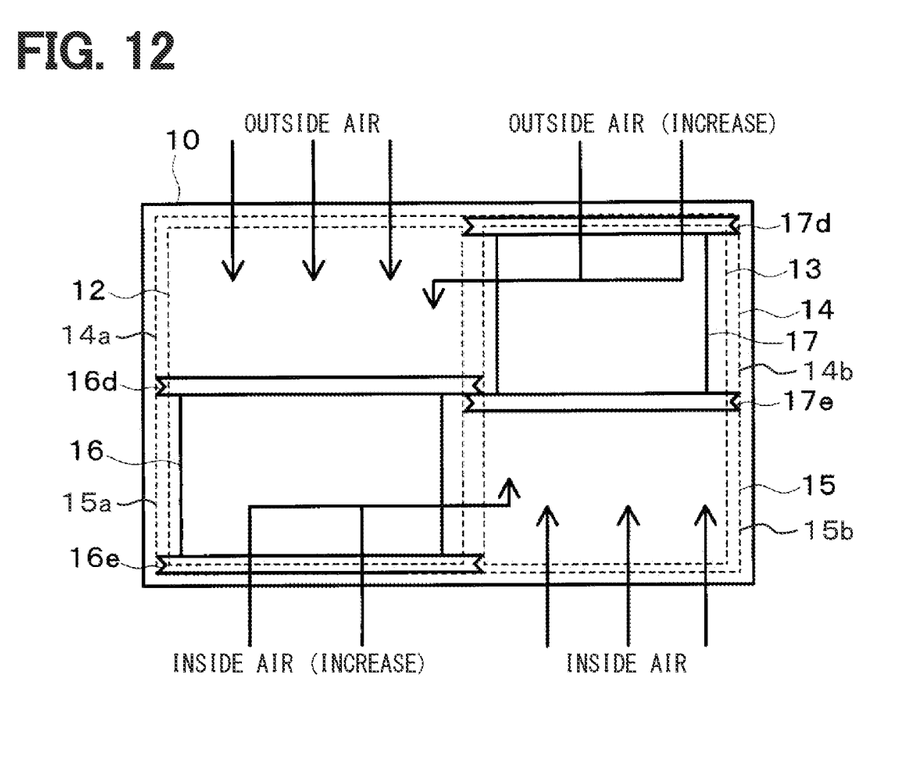
FIG. 12 is a diagram showing positions of the internal-external air switching doors of the second embodiment during the two-layer external/internal air mode.

As shown in FIG. 12, during the two-layer external/internal air mode, the first internal-external air switching door 16 is located at the external air introducing position and the second internal-external air switching door 17 is located at the internal introducing position. During the two-layer external/internal air mode, the internal-external air switching door 16 restricts internal air from flowing into the first passage 12 through the internal air inlet 15 and external air is directly introduced into the first passage 12 through the external air inlet 14. Further, during the two-layer external/internal air mode, the second internal-external air switching door 17 restricts external air from flowing into the second passage 13 through the external air inlet 14 and internal air is introduced into the second passage 13 through the internal air inlet 15.

At this time, the external air sealing portion 16d of the first internal-external air switching door 16 is in contact with the internal air sealing portion 17e of the second internal-external air switching door 17. As a result, a gap between the first internal-external air switching door 16 and the second internal-external air switching door 17 is sealed. Therefore, external air introduced into the first passage can be separated from internal air introduced into the second passage 13.

That is, in the second embodiment, the external air sealing portion 16d of the first internal-external air switching door 16 and the internal air sealing portion 17e of the second internal-external air switching door 17 form a sealing structure that separates external air introduced into the first passage 12 from internal air introduced into the second passage.

In the second embodiment described above, no partition member is provided between the first internal-external air switching door 16 and the second internal-external air switching door 17. As a result, during the two-layer external/internal air mode, a pressure loss when external air is introduced into the first passage 12 and internal air is introduced into the second air passage 13 can be reduced, thereby improving a heating efficiency.

Further, in the second embodiment, the external air sealing portion 16d of the first internal-external air switching door 16 is in contact with the internal air sealing portion 17e of the second internal-external air switching door 17 during the two-layer external/internal air mode, so that a gap between the first internal-external air switching door 16 and the second internal-external air switching door 17 can be sealed. That is, the first internal-external air switching door 16 and the second internal-external air switching door 17 come into contact with each other across the external air sealing portion 16d and the internal air sealing portion 17e. As a result, external air introduced into the first passage 12 can be separated from internal air introduced into the second passage 13 without disposing the partition 21 between the first internal-external air switching door 16 and the second internal-external air switching door 17.

The present disclosure is not limited to the embodiments described above, and various modifications can be made as follows within a scope not departing from the spirit of the present disclosure. Further, means disclosed in the above embodiments may be appropriately combined within an enabling range.

For example, in each of the above embodiments, the present disclosure is applied to the blower unit 1 defining the two passages 12 and 13. However, the present disclosure may be applied to a blower unit defining three or more passages.

Further, in each of the above embodiments, the sealing portions 16e and 17e of the internal-external air switching doors 16 and 17 are configured with elastomer, but the sealing portions 16e and 17e may be made of a material other than elastomer.

Although the present disclosure has been described in accordance with the examples, it is understood that the disclosure is not limited to such examples or structures. The present disclosure also includes various modifications and variations within an equivalent range. In addition, while the various combinations and configurations, which are preferred, other combinations and configurations, including more, less or only a single element, are also within the spirit and scope of the present disclosure.

What is claimed is:

1. A blower unit for an air conditioner configured to supply an external air outside of a vehicle and an internal air inside of the vehicle into a vehicle compartment as a conditioned air, the blower unit comprising:
   a casing defining therein a first passage and a second passage, the casing further defining:
      a first external air inlet through which the external air is introduced into the first passage of the casing and a second external air inlet through which the external air is introduced into the second passage of the casing; and
      a first internal air inlet through which the internal air is introduced into the first passage of the casing and a second internal air inlet through which the internal air is introduced into the second passage of the casing;
   a first door rotatably disposed in the first passage;
   a second door rotatably disposed in the second passage; and
   a partition configured to separate the first passage from the second passage, the partition defining at least one opening, wherein
   the partition is disposed between the first door and the second door,
   during a two-layer internal/external air mode:
      the first passage and the second passage are fluidly connected to each other through the at least one opening of the partition;
      the external air is directly introduced into the first passage through the first external air inlet, and the external air is directed by the second door to flow into the first passage through the at least one opening of the partition; and
      the internal air is directly introduced into the second passage through the second internal air inlet, and the internal air is directed by the first door to flow into the second passage through the at least one opening of the partition.

2. The blower unit according to claim 1, further comprising
   an elastomer disposed between the partition and at least one of the first door and the second door, wherein
   the elastomer is configured to separate the external air introduced into the first passage from the internal air introduced into the second passage.

3. The blower unit according to claim 1, wherein
   during the two-layer internal/external air mode, the first door and the second door are overlapped with each other when viewed in an arranging direction of the first passage and the second passage, and
   the at least one opening of the partition is positioned outside of a portion of the partition corresponding to an overlapping area between the first door and the second door.

4. A blower unit for an air conditioner configured to supply an external air outside of a vehicle and an internal air inside of the vehicle into a vehicle compartment as a conditioned air, the blower unit comprising:
   a casing defining therein a first passage and a second passage, the casing further defining:
      a first external air inlet through which the external air is introduced into the first passage of the casing and a second external air inlet through which the external air is introduced into the second passage of the casing; and
      a first internal air inlet through which the internal air is introduced into the first passage of the casing and a second internal air inlet through which the internal air is introduced into the second passage of the casing;
   a first door rotatably disposed in the first passage; and
   a second door rotatably disposed in the second passage, wherein
   during a two-layer internal/external air mode:
      the first door and the second door tightly come into contact with each other to seal a gap between the first door and the second door and to separate the external air introduced into the first passage from the internal air introduced into the second passage;
      the external air is directly introduced into the first passage through the first external air inlet, and the external air is directed by the second door to flow into the first passage from the second passage; and
      the internal air is directly introduced into the second passage through the second internal air inlet, and the internal air is directed by the first door to flow into the second passage from the first passage.

5. The blower unit according to claim 1, wherein each of the first door and the second door is a rotary door configured to rotate about a rotational shaft.

6. A blower comprising:
a casing that defines therein an inner space;
a partition that is disposed in the casing and divides the inner space into a first passage and a second passage, the partition defining a first opening and a second opening;
a first external air inlet and a first internal air inlet that are defined in the casing and in communication with the first passage;
a second external air inlet and a second internal air inlet that are defined in the casing and in communication with the second passage;
a first door that is rotatably disposed in the first passage; and
a second door that is rotatably disposed in the second passage, wherein
during a two-layer mode:
 the first opening allows the internal air directed by the first door to flow toward the second internal air inlet through the first opening during the two layer mode; and
 the second opening allows the external air directed by the second door to flow toward the first external air inlet through the second opening.

* * * * *